US011670029B2

(12) United States Patent
Hu et al.

(10) Patent No.: US 11,670,029 B2
(45) Date of Patent: Jun. 6, 2023

(54) METHOD AND APPARATUS FOR PROCESSING CHARACTER IMAGE DATA

(71) Applicant: BEIJING BAIDU NETCOM SCIENCE AND TECHNOLOGY CO., LTD., Beijing (CN)

(72) Inventors: Tianshu Hu, Beijing (CN); Mingming Ma, Beijing (CN); Shengyi He, Beijing (CN); Hanqi Guo, Beijing (CN); Tonghui Li, Beijing (CN); Zhibin Hong, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/191,444

(22) Filed: Mar. 3, 2021

(65) Prior Publication Data

US 2022/0084274 A1    Mar. 17, 2022

(30) Foreign Application Priority Data

Sep. 14, 2020   (CN) .......................... 202010963667.7

(51) Int. Cl.
*G06T 13/40* (2011.01)
*G06N 20/00* (2019.01)
*G06V 40/16* (2022.01)

(52) U.S. Cl.
CPC .............. *G06T 13/40* (2013.01); *G06N 20/00* (2019.01); *G06V 40/168* (2022.01); *G06V 40/176* (2022.01)

(58) Field of Classification Search
CPC ........... G06T 13/40; G06T 13/80; G06T 5/50; G06T 2207/10016; G06T 2207/20212; G06T 2207/30201; G06N 20/00; G06V 40/168; G06V 40/176
See application file for complete search history.

(56) References Cited

U.S. PATENT DOCUMENTS

| | | | |
|---|---|---|---|
| 11,182,947 B1* | 11/2021 | Wu | G06T 19/20 |
| 2008/0170078 A1* | 7/2008 | Sullivan | G06T 17/20 |
| | | | 345/473 |
| 2009/0202114 A1* | 8/2009 | Morin | G06T 7/246 |
| | | | 382/118 |
| 2021/0390767 A1* | 12/2021 | Johnson | G06V 40/176 |

* cited by examiner

*Primary Examiner* — Jitesh Patel
(74) *Attorney, Agent, or Firm* — Seed IP Law Group LLP

(57) ABSTRACT

A method and apparatus for processing character image data are provided. A specific embodiment of the method can include: acquiring a video including character images of a first character as first data, and acquiring a video including character images of a second character as second data, the video including character images of the first character including a plurality of types of movement-state images; replacing a head image extracted from the first data with a head image extracted from the second data; replacing a face extracted from the first data with a face extracted from the second data; and replacing the face in the replaced head image with the replaced face to obtain a target head image.

19 Claims, 5 Drawing Sheets

100

METHOD AND APPARATUS FOR PROCESSING CHARACTER IMAGE DATA

CROSS-REFERENCE TO RELATED APPLICATIONS

This application claims priority to Chinese Patent Application No. 202010963667.7, filed with the China National Intellectual Property Administration (CNIPA) on Sep. 14, 2020, the contents of which is incorporated herein by reference in its entirety.

TECHNICAL FIELD

The present disclosure relates to the field of artificial intelligence technology, particularly to the fields of computer vision and deep learning technology, and more particularly to a method and apparatus for processing character image data.

BACKGROUND

With the development of virtual character generation technology, digital virtual character show great application potential in many industries. Digital virtual character is a multi-modal character video generation task, which may drive a virtual character using voice or text.

The modeling of digital virtual character often requires recording a large amount of data in a specific environment. Every time a new character is modeled, it is necessary to invite the model to come to a professional film studio in person, and to be guided by a professional director to complete some specific performances, which undoubtedly increases the cost of virtual character image production.

SUMMARY

A method and apparatus for processing character image data, an electronic device and a storage medium are provided.

In a first aspect, a method for processing character image data is provided. The method includes: acquiring, as first data, a first video comprising character images of a first character, and acquiring, as second data, a second video comprising character images of a second character, wherein a video comprising character images comprises a movement-state image comprising a head movement-state image, and the first video comprising the character images of the first character includes a plurality of types of movement-state images; replacing a head image extracted from the first data with a head image extracted from the second data to obtain a replaced head image, wherein the replaced head image has a head movement-state image of the first character and a head attribute image of the second character; replacing a face extracted from the first data with a face extracted from the second data to obtain a replaced face, wherein the replaced face has a face movement-state image of the first character and a face attribute image of the second character, and a clarity of the replaced face is greater than a clarity of a face in the replaced head image; and replacing the face in the replaced head image with the replaced face to obtain a target head image.

In a second aspect, an apparatus for processing character image data is provided. The apparatus includes: an acquisition unit, configured to acquire a first video including character images of a first character as first data, and acquire a video including character images of a second character as second data, wherein a video including character images comprises a movement-state image comprising a head movement-state image, and the first video including character images of the first character includes a plurality of types of movement-state images; a head image replacing unit, configured to replace a head image extracted from the first data with a head image extracted from the second data to obtain a replaced head image, wherein the replaced head image has a head movement-state image of the first character and a head attribute image of the second character; a face replacing unit, configured to replace a face extracted from the first data with a face extracted from the second data to obtain a replaced face, wherein the replaced face has a face movement-state image of the first character and a face attribute image of the second character, and a clarity of the replaced face is greater than a clarity of a face in the replaced head image; and a replacing unit, configured to replace the face in the replaced head image with the replaced face to obtain a target head image.

In a third aspect, an electronic device is provided. The electronic device includes: one or more processors; and a storage apparatus, for storing one or more programs, the one or more programs, when executed by the one or more processors, cause the one or more processors to implement the method according to any one of embodiments of the first aspect.

In a fourth aspect, a computer readable storage medium is provided. The computer readable storage medium stores a computer program thereon, the program, when executed by a processor, cause the processor to implement the method according any one of the embodiments of the first aspect.

According to the technical solution of the present disclosure, the head image that contains the attribute image of the first character and the movement-state image of the second character may be obtained through the head image replacing operation, so that the replaced head image has different characteristics of different head images, so as to realize the combination of the two head images. Moreover, combining the first character having rich movement-state images may make up for the problem of insufficient movement-state image richness of the second character, so that the generated target head image has the head image attribute of the second character and has rich movement-state images. In addition, the face replacing operation performed on the face may effectively improve the clarity of the face in the replaced head image.

BRIEF DESCRIPTION OF THE DRAWINGS

By reading the detailed description of non-limiting embodiments with reference to the following accompanying drawings, other features, objectives and advantages of the present disclosure will become more apparent.

DETAILED DESCRIPTION OF EMBODIMENTS

Figure 1:
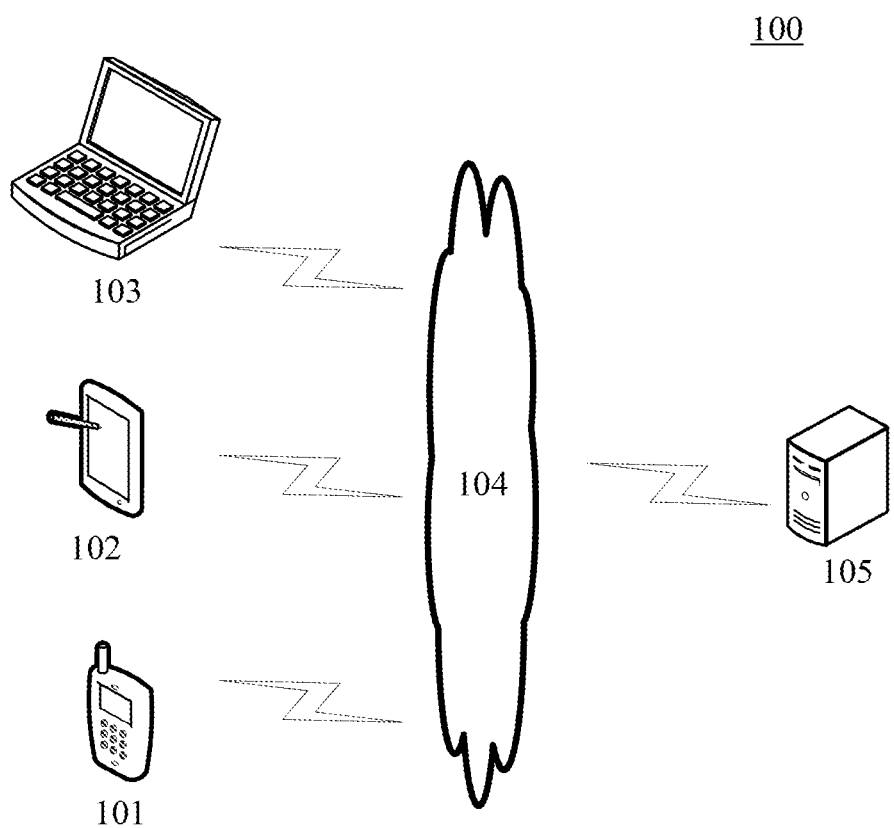
FIG. 1 is a diagram of a system architecture in which some embodiments of the present disclosure may be implemented.

FIG. 1 illustrates a system architecture 100 in which an embodiment of a method for processing character image data or an apparatus for processing character image data may be implemented.

As shown in FIG. 1, the system architecture 100 may include terminal devices 101, 102, 103, a network 104, and a server 105. The network 104 is used to provide a communication link medium between the terminal devices 101, 102, 103 and the server 105. The network 104 may include various types of connections, such as wired, wireless communication links, or optic fibers.

A user may interact with the server 105 through the network 104 using the terminal device 101, 102, or 103, to receive or send messages and the like. Various communication client applications, such as video applications, live broadcast applications, instant messaging tools, email clients, or social platform software, may be installed on the terminal devices 101, 102, and 103.

The terminal devices 101, 102, and 103 may be hardware or software. When the terminal devices 101, 102, and 103 are hardware, they may be various electronic devices having display screens, including but not limited to smart phones, tablet computers, E-book readers, laptop portable computers, desktop computers, or the like. When the terminal devices 101, 102, and 103 are software, they may be installed in the electronic devices listed above. They may be implemented as, for example, a plurality of software or software modules (for example, a plurality of software or software modules for providing distributed services), or as a single software or software module, which is not specifically limited herein.

The server 105 may be a server that provides various services, such as a backend server that provides support for the terminal devices 101, 102, and 103. The backend server may perform analysis and other processing on received character image data and other data, and feedback a processing result (for example, a target head image) to the terminal devices.

It should be noted that the method for processing character image data provided by embodiments of the present disclosure may be performed by the server 105, or performed by the terminal device 101, 102, or 103. Correspondingly, the apparatus for processing character image data may be provided in the server 105, or provided in the terminal device 101, 102, or 103.

It should be understood that the number of terminal devices, networks, and servers in FIG. 1 is merely illustrative. Depending on the implementation needs, there may be any number of terminal devices, networks, and servers.

Figure 2:
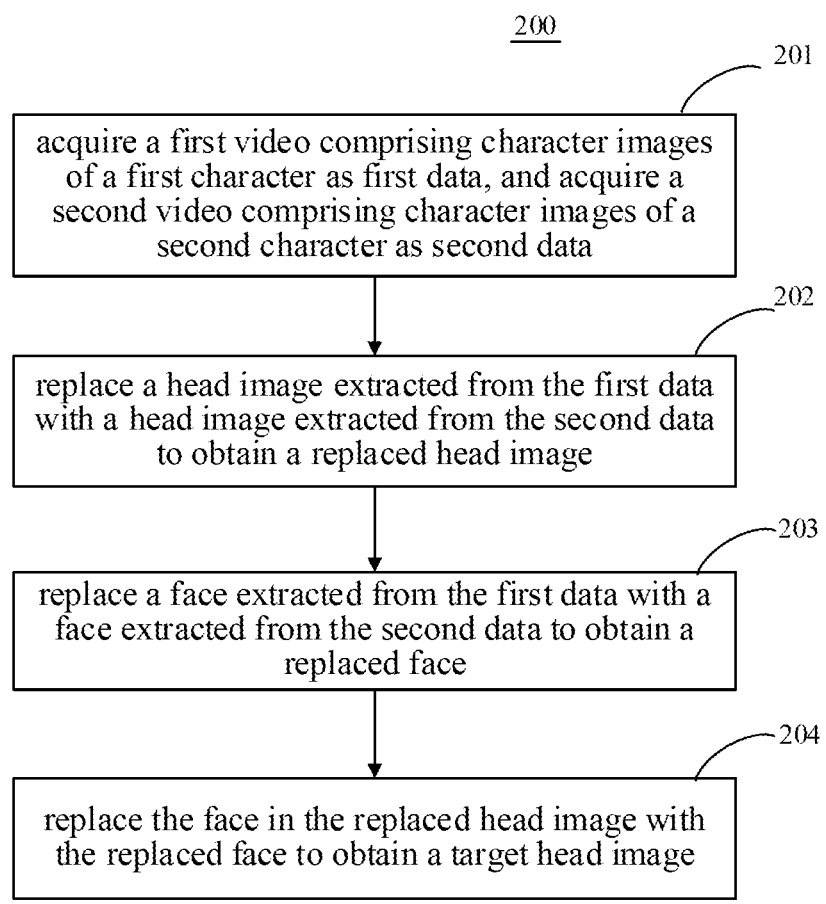
FIG. 2 is a flowchart of a method for processing character image data according to an embodiment of the present disclosure.

With further reference to FIG. 2, a flow 200 of a method for processing character image data according to an embodiment of the present disclosure is illustrated. The method for processing character image data includes the following steps:

Step 201, acquiring, as first data, a first video comprising character images of a first character, and acquiring, as second data, a second video comprising character images of a second character, wherein a video comprising character images comprises a movement-state image comprising a head movement-state image, and the first video comprising the character images of the first character including a plurality of types of movement-state images.

In the present embodiment, an executing body (for example, the server or terminal device shown in FIG. 1) on which the method for processing character image data operates may acquire the video including character images of the first character, and takes the video including the character images as the first data. In addition, the executing body may acquire the video including character images of the second character, and take the video including character images as the second data. In practice, the character here may refer to a real character or a virtual character such as a cartoon character. The number of the video including character images about the first character and the number of the video including character images about the second character acquired herein may both be at least one. In practice, the number of types of movement-state images included in the second data may be less than the number of types of the movement-state images included in the first data, and the number of types of videos including character images of the first character may be more than one, such as facial expression and lip roundness. More than one here refers to at least two.

The video including character images includes a movement-state image, the video including character images of the first character includes the movement-state images of the first character, and the video including character images of the second character includes the movement-state image of the second character. The movement-state image here may include a head movement-state image.

The movement-state image may refer to a character image that reflects a movement state of the character rather than a relaxed natural state, that is, an image that shows the state of movement of parts of the character. For example, a movement-state image may include a character with his/her arms highly raised. The image here may be a full-body image or a movement-state image of a specific part such as the head or below the head.

Step 202, replacing a head image extracted from the first data with a head image extracted from the second data to obtain a replaced head image, the replaced head image having a head movement-state image of the first character and a head attribute image of the second character.

In the present embodiment, the executing body may replace the head image of the first character extracted from the first data with the head image of the second character extracted from the second data, and use the replacement result as the replaced head image. Particularly, the extracted head image refers to a head image area in the video.

In practice, the executing body may implement the replacement by various manners. For example, the executing body may perform the replacement using a head image replacement model. In addition, the executing body may also replace the head image through image fusion. An attribute image may refer to an image that can reflect the attributes of a character, that is, the appearance, which does not change with the movement of any part of the character, such as facial features (i.e., the five sense organs), face shape, hair, and wear. The head attribute image may include facial features, face shape, hair (which may include hair color, hairstyle, etc.), headwear, and the like.

Step 203, replacing a face extracted from the first data with a face extracted from the second data to obtain a replaced face, the replaced face having a face movement-state image of the first character and a face attribute image of the second character, and a clarity of the replaced face being greater than a clarity of a face in the replaced head image.

In the present embodiment, the executing body may replace the face of the first character extracted from the first data with the face of the second character extracted from the second data, and use the replacement result as the replaced face. The face attribute image may include the facial features, in addition, the face attribute image may also include face shape and the like. The face movement-state image may include facial expression and the like.

In practice, after performing face replacement on the face, the obtained replaced face is clearer than the face in the replaced head image.

Step 204, replacing the face in the replaced head image with the replaced face to obtain a target head image.

In the present embodiment, the executing body may replace the face in the replaced head image with the replaced face, thereby obtaining the target head image. The face attribute image of the face in the target head image is the face attribute image of the above replaced face, and the head attribute image of an area other than the face of the target head image is the head attribute image of the above replaced head image.

The method provided by the above embodiment of the present disclosure, may obtain the head image that contains the attribute image of the second character and the movement-state image of the first character through the head image replacing operation, so that the replaced head image has different characteristics of different head images, so as to realize an organic combination of the two head images. Moreover, by combining the first character having rich movement-state images may make up for the problem of insufficient movement-state image richness of the second character, so that the generated target head image has the head image attribute of the second character and has rich movement-state images. In addition, the face replacing operation performed on the face may effectively improve the clarity of the face in the replaced head image.

In some alternative implementations of the present embodiment, a time length of the video including character images of the first character is greater than a time length of the video including character images of the second character, and the plurality of types of movement-state images in the first data include a plurality of types of necessary movement-state images required to create a virtual character, for each type of at least one type of the plurality of types of necessary movement-state images, the second data lacks at least one of a plurality of necessary movement-state images included in the type of necessary movement-state image.

In these alternative implementations, the necessary movement-state images may include a variety of types of head movement-state images, and the necessary movement-state images include images shot from a plurality of angles. The plurality of angles here include a positive angle. For example, the necessary movement-state images may include at least two of the following types: head movement-state images shot from the positive angle and head movement-state images shot from a side angle. The head movement-state images include a plurality of preset facial expressions and a plurality of preset lip roundness. In addition, the necessary movement-state images may also include various types of body movement-state images, such as various body movements. The plurality of types of movement-state images of the first data may also include an expressionless head image required to create the virtual character, that is, a necessary attribute image. The second data lacks at least one type of necessary movement-state image, or for each type of at least one type of necessary movement-state image, the second data lacks at least one of a plurality of necessary movement-state images included in the this type of necessary movement-state image. For example, the necessary movement-state image contains 60 preset facial expressions, and the second data lacks 50 of these preset facial expressions.

The head movement-state image in the second data includes an image shot from the positive angle, and the necessary movement-state images include images shot from a plurality of angles including the positive angle. Particularly, the second data may only include the image shot from the positive angle. The positive angle refers to the angle from the front side of the character, or refers to an angle having an angle difference from the positive angle less than a preset angle threshold. For example, the preset angle threshold may be 10 degrees.

These implementations may use the first data including the necessary movement-state images, and use a small amount and low richness data of the second character to perform the head image replacement and face replacement operations. These implementations save the time for collecting the necessary movement-state images of the second character, and conducive to reduce the time and labor cost of constructing a virtual character of the second character.

In some alternative application scenarios of these implementations, the head movement-state image in the first data includes a lip roundness and a facial expression, and the head movement-state image in the second data includes a lip roundness and/or a facial expression; and the method may further include: creating the virtual character based on the target head image, where the virtual character has the head movement-state image of the first character and the head attribute image of the second character.

In these alternative application scenarios, the executing body may create the virtual character based on the obtained target head image. In practice, the executing body may create the virtual character based on the target head image through various manners. For example, the executing body may use the head movement-state images in the plurality of necessary movement-state images to create the virtual character.

Particularly, the head movement-state image of the first character in the first data may include dynamic lip roundness and facial expressions. For example, the lip shape roundness may include open mouth and closed mouth. The second data may include only the lip roundness, or only the facial expression, in addition, the second data may also include both of the lip roundness and the facial expression. The number of head movement-state images included in the second data may be less than the number of head movement-state images included in the first data.

These application scenarios may use the first data including the necessary movement-state images, and use a small amount and low richness data of the second character to create a virtual character having ahead image appearance of the second character. These application scenarios save the time for collecting the necessary movement-state images of the second character, and reduce the time and labor cost of constructing a virtual character of the second character.

Alternatively, the plurality of types of movement-state images in the first data also include a body movement-state image, and the body movement-state image includes a body movement; and the creating the virtual character based on the target head image in these application scenarios, may include: combining the target head image and the first data, so that a head image in the combined first data is the target head image; and creating the virtual character based on the combined first data, where the virtual character has a body attribute image of the first character, the head movement-state image of the first character, and the body movement-state image of the first character, and the head attribute image of the second character.

Particularly, the executing body may combine the target head image and the first data, so that the head image in the first data is the target head image. Particularly, the executing body may perform the combination processing using various methods. For example, the executing body may fuse the target head image with the first data to obtain a combination result. In addition, the executing body may also use the target head image and the head image replacement model to replace the head image in the first data to obtain a combination result. In practice, in the combination processing, the executing body may align the target head image with the head image in the first data before fusing or using the head image replacement model.

The created virtual character may have the head attribute image, i.e. the appearance of the head image, of the second character, and other images such as body appearance, facial expression, lip roundness, and body movement may all be features in in the first data.

The executing body may splice the target head image to the body of the first character, so that the created virtual character not only has the head image, but also has the body part of the first character.

In some alternative implementations of the present embodiment, the replacing a face extracted from the first data with a face extracted from the second data in step 203, may include: replacing the face extracted from the first data with the face extracted from the second data using a face replacement model, where the face replacement model is used to replace a to-be-replaced face with an adopted face, so that an obtained face has a face movement-state image of the to-be-replaced face and a face attribute image of the adopted face.

In these alternative implementations, in the present embodiment, the executing body may use the face replacement model to replace the face extracted from the first data. The face replacement model may be any one of various models that can perform face replacement, such as Generative Adversarial Networks (GAN). Particularly, the face replacement model may be used to replace the face of the first character with the face of the second character, so that the replaced face includes the face movement-state image of the first character and the face attribute image of the second character.

These implementations may use the face replacement model to replace the face, so as to ensure that the attribute image of the replaced face is consistent with the attribute image of the second character, and to ensure that the movement-state image of the replaced face is consistent with the movement-state image of the first character.

In some alternative application scenarios of these implementations, the method may further include: extracting the face of the first character and the face of the second character from the first data and the second data respectively; and the face replacement model is obtained by training through the following step: training an initial face replacement model, based on each of the extracted faces, to obtain a trained face replacement model.

In these alternative application scenarios, the executing body may extract the face of the first character from the first data, and extract the face of the second character from the second data. The executing body or other electronic devices may train the initial face replacement model based on the face of the first character and the face of the second character, so as to obtain an applicable face replacement model.

In practice, the executing body or other electronic devices may train the initial face replacement model based on the face of the first character and the face of the second character using various methods. For example, the executing body may generate a face having the face attribute image of the second character using a generator of GAN, and recognize whether the generated face has the face attribute image of the second character using a discriminator of GAN. If a recognition result is yes, then GAN, i.e., the face replacement model training is completed.

These application scenarios may train using the face of the first character and the face of the second character, so that the face generated by the trained model has the face movement-state image of the first character and the face attribute image of the second character.

In some alternative application scenarios of these implementations, the initial face replacement model includes an encoder and decoders, and the number of the decoders is two; the training an initial face replacement model, based on each of the extracted faces, to obtain a trained face replacement model, may include: training the encoder and the decoders based on the face in the second data, so that a face generated by one of the decoders has the face attribute image of the second character.

In these alternative application scenarios, the executing body or other electronic devices may train the encoder and the decoders based on the face of the first character in the first data and the face of the second character in the second data, so that the face generated by one of the decoders (such as a first decoder) has the face attribute image of the second character.

In practice, taking the above executing body to perform the method as an example, the executing body may train the encoder and the first decoder based on the second data, so that the first decoder generates the face having the face attribute image of the second character. In addition, the executing body may train the encoder and a second decoder based on the first data, so that features extracted by the encoder include features of the face movement-state image in the first data. Then, the executing body may also train the encoder, the first decoder, and the second decoder based on the second data, so that the face generated by the first decoder has the face attribute image of the second character, and the trained face replacement model is obtained.

These application scenarios may use the encoder and the decoders as models for face replacing operation, so that after training the encoder and the decoders, an accurate face replacement model may be obtained, so that a face generated by this model has accurate face attribute of the second character.

Alternatively, the extracting the face of the first character and the face of the second character from the first data and the second data respectively, may include: locating key points of the face in the first data and key points of the face in the second data, and aligning the faces in the first data and the second data based on the key points of the faces; and performing image segmentation on an alignment result of the first data to extract the face in the first data, and performing image segmentation on an alignment result of the second data to extract the face in the second data.

The executing body may detect key points of the faces in the first data and the second data to locate the key points of the faces. In this way, the executing body may perform face alignment on the first data and the second data based on the key points. For example, the executing body may use a key point template to realize alignment, that is, the key points detected in the first data are aligned with the key point template, and the key points detected in the second data are aligned with the key point template, so as to realize the alignment of the faces in the first data and the second data.

The executing body may perform image segmentation on the aligned first data to extract a face area of the first character in the first data, and perform image segmentation on the aligned second data to obtain a face area of the second character in the second data. In practice, image segmentation here may refer to separating the foreground and the background, or refer to face detection.

The executing body may accurately extract the face of the character through the alignment and image segmentation.

In some alternative implementations of the present embodiment, the replacing the face in the replaced head image with the replaced face in step 204, may include: locating key points of the face in the replaced face and key points of the face in the replaced head image, and aligning the faces in the replaced face and the replaced head image according to the key points; and replacing the face in the aligned replaced head image with the aligned replaced face through face fusion.

In these alternative implementations, the executing body may locate the key points of the face in the replaced face, and locate the key points of the face in the replaced head image, and align the faces in the replaced face and the replaced head image according to the located key points. The executing body may realize face replacement through face fusion after the alignment.

These implementations may realize rapid face replacement without involving movement-state images through alignment and face fusion.

Figure 3:
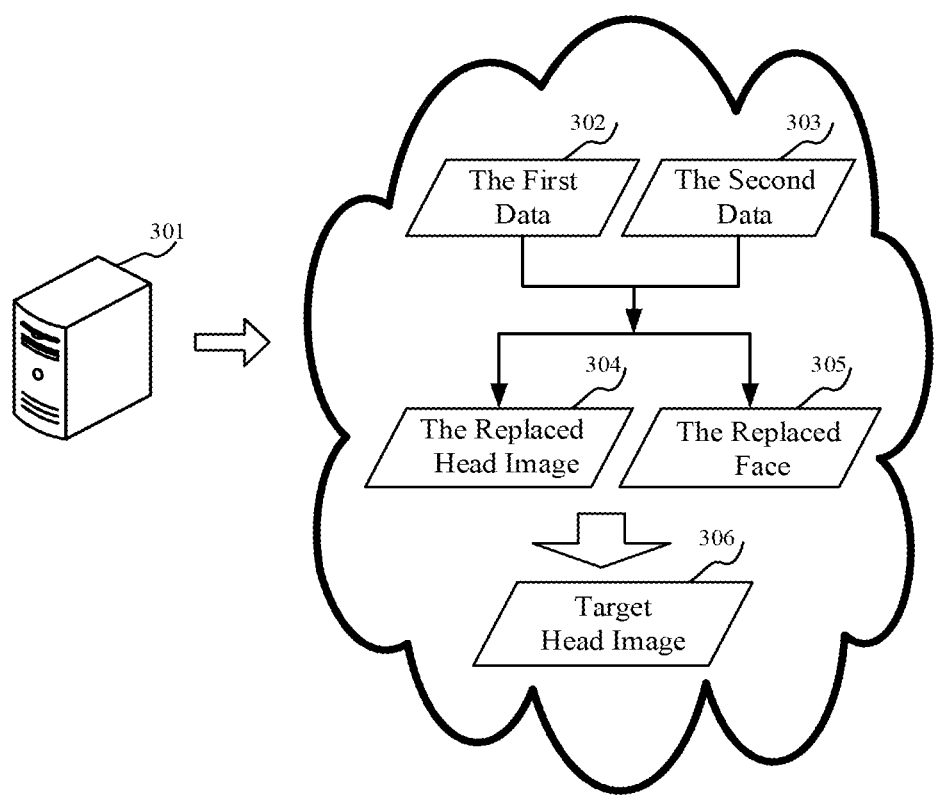
FIG. 3 is a schematic diagram of an application scenario of the method for processing character image data according to an embodiment of the present disclosure.

With further reference to FIG. 3, FIG. 3 is a schematic diagram of an application scenario of the method for processing character image data according to the present embodiment. In the application scenario of FIG. 3, the executing body 301 acquires a video including character images of the first character Zhang San as first data 302, and acquires a video including character images of a second character Li Si as second data 303, where the video including character images has a movement-state image including a head movement-state image, and the video including character images of Zhang San has a plurality of types of movement-state images. The executing body 301 replaces the head image extracted from the first data with the head image extracted from the second data, to obtain a replaced head image 304, where the replaced head image has the head movement-state image of Zhang San and a head attribute image of Li Si. The executing body 301 replaces a face extracted from the first data with a face extracted from the second data to obtain a replaced face 305, where the replaced face has a face movement-state image of Zhang San and a face attribute image of Li Si, and the clarity of the replaced face is greater than the clarity of a face in the replaced head image. The executing body 301 replaces the face in the replaced head image with the replaced face to obtain the target head image 306.

Figure 4:
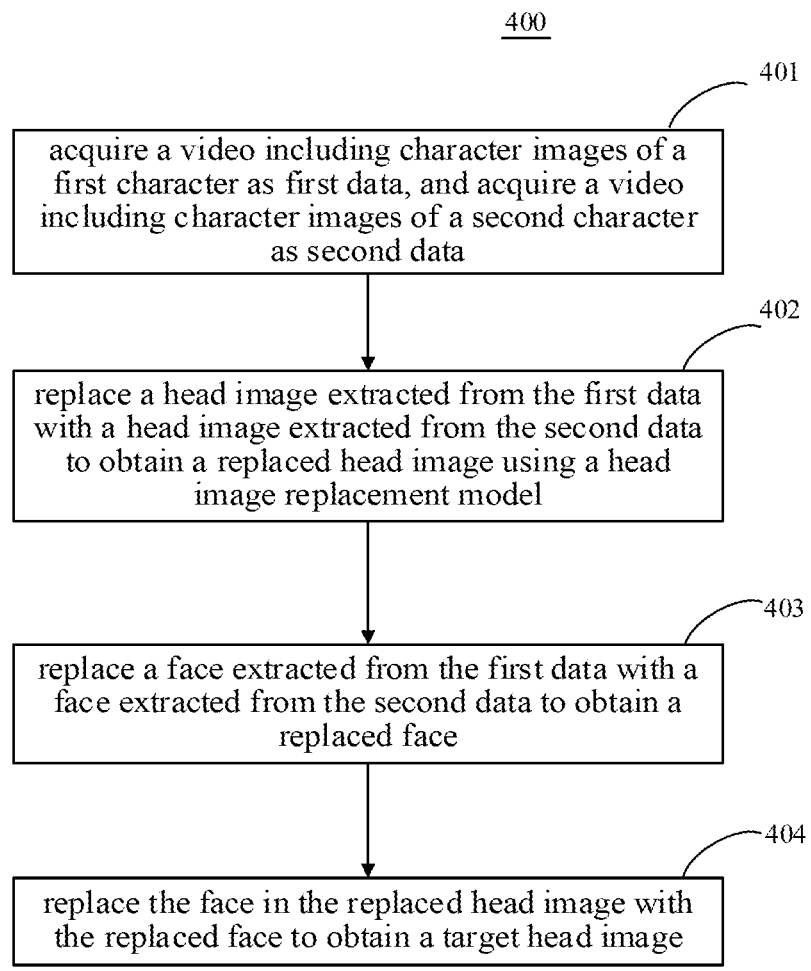
FIG. 4 is a flowchart of the method for processing character image data according to another embodiment of the present disclosure.

With further reference to FIG. 4, a flow 400 of a method for processing character image data according to another embodiment is illustrated. The flow 400 includes the following steps:

Step 401, acquiring a video including character images of a first character as first data, and acquiring a video including character images of a second character as second data, where the video including character images includes a movement-state image including a head movement-state image, and the video including character images of the first character includes a plurality of types of movement-state images.

In the present embodiment, an executing body (for example, the server or terminal device shown in FIG. 1) on which the method for processing character image data operates may acquire the video including character images of the first character, and use the video including character images as the first data. In addition, the executing body may acquire the video including character images of the second character, and use the video including character images as the second data. In practice, the character here may refer to a real character or a virtual character such as a cartoon character. The number of the videos including character images about the first character and the second character acquired here both may be at least one.

Step 402, replacing a head image extracted from the first data with a head image extracted from the second data to obtain a replaced head image using a head image replacement model, and the replaced head image has the head movement-state image of the first character and a head attribute image of the second character, where the head image replacement model is used to replace a to-be-replaced head image with an adopted head image, so that an obtained head image has a head movement-state image of the to-be-replaced head image and a head attribute image of the adopted head image.

In the present embodiment, the executing body may replace the head image extracted from the first data using the head image replacement model. The head image replacement model may be any one of the various models that can perform head image replacement, such as Generative Adversarial Networks (GAN). The head image replacement model may be used to replace the head image of the first character with the head image of the second character, so that the replaced head image includes the head movement-state image of the first character and the head attribute image of the second character.

The head image replacement model is used to replace the to-be-replaced head image with the adopted head image, so that the obtained head image, that is, the replacement result has the head movement-state image of the to-be-replaced head image and the head attribute image of the adopted head image.

Step 403, replacing a face extracted from the first data with a face extracted from the second data to obtain a replaced face, where the replaced face has a face movement-state image of the first character and a face attribute image of the second character, and a clarity of the replaced face is greater than a clarity of a face in the replaced head image.

In the present embodiment, the executing body may replace the face of the first character extracted from the first data with the face of the second character extracted from the second data, and use the replacement result as the replaced face.

Step 404, replacing the face in the replaced head image with the replaced face to obtain a target head image.

In the present embodiment, the executing body may replace the face in the replaced head image with the replaced face, thereby obtaining the target head image. The face attribute image of the face included in the target head image is the face attribute image of the above replaced face, and the head attribute image of a part other than the face of the target head image is the head attribute image of the above replaced head image.

The present embodiment may use the head image replacement model to realize replacement of the head image, so as to ensure that the attribute image of the replaced head image is consistent with the attribute image of the second character, and to ensure that the movement-state image of the replaced head image is consistent with the movement-state image of the first character.

In some alternative implementations of the present embodiment, the method may further include: extracting the head image of the first character and the head image of the second character from the first data and the second data respectively; and the head image replacement model may be obtained by training through the following step: training an initial head image replacement model, based on each of the extracted head images, to obtain a trained head image replacement model.

In these alternative implementations, the executing body may extract the head image of the first character from the first data, and extract the head image of the second character from the second data. The executing body or other electronic devices may train the initial head image replacement model based on the head image of the first character and the head image of the second character, so as to obtain an applicable head image replacement model.

In practice, the executing body or other electronic devices may train the initial head image replacement model based on the head image of the first character and the head image of the second character using various methods. For example, the executing body may generate a head image having the head attribute image of the second character through a generator of GAN, and recognize whether the generated head image has the head attribute image of the second character through a discriminator of GAN. If the recognition result is yes, then the training of the GAN, i.e., the head image replacement model, is completed.

These implementations may perform the training based on the head image of the first character and the head image of the second character, so that the head image generated by the trained model has the movement-state image of the first character and the head attribute image of the second character.

In some alternative application scenarios of these implementations, the initial head image replacement model includes an encoder and decoders, and the number of the decoders is two; the training the initial head image replacement model, based on each of the extracted head images, to obtain the trained head image replacement model in these implementations, may include: training the encoder and the two decoders based on the head image of the first character in the first data and the head image of the second character in the second data, so that a head image generated by one of the decoders has the head attribute image of the second character.

In these alternative application scenarios, the executing body or other electronic device may train the encoder and the decoders based on the head image of the first character in the first data and the head image of the second character in the second data, so that the head image generated by one of the decoders (such as a first decoder) has the head attribute image of the second character.

In practice, taking the method is performed by the above executing body as an example, the executing body may train the encoder and the first decoder based on the second data, so that the first decoder generates the head image having the head attribute image of the second character. In addition, the executing body may train the encoder and a second decoder based on the first data, so that features extracted by the encoder include features of the head movement-state image in the first data. Then, the executing body may also train the encoder, the first decoder, and the second decoder based on the second data, so that the head image generated by the first decoder has the head attribute image of the second character, and the trained head image replacement model is obtained.

These application scenarios may use the encoder and the decoders as models for head image replacing operation, so that after training the encoder and the decoders, an accurate head image replacement model may be obtained, so that a head image generated by this model has accurate head image attribute of the second character.

Alternatively, the extracting the head image of the first character and the head image of the second character from the first data and the second data respectively, may include: locating key points of the head image in the first data and key points in the second data, and aligning the head image in the first data with the head image in the second data according to the key points; and performing image segmentation on an alignment result of the first data to extract the head image in the first data, and performing image segmentation on an alignment result of the second data to extract the head image in the second data.

The executing body may perform detection on key points of the head images in the first data and the second data to locate the key points of the head images. In this way, the executing body may perform head image alignment on the first data and the second data based on the key points. For example, the executing body may use a key point template to realize the alignment, that is, the key points detected in the first data are aligned with the key point template, and the key points detected in the second data are aligned with the key point template, so as to realize the alignment between the head images in the first data and the second data.

The executing body may perform image segmentation on the aligned first data to extract a head image area of the first character in the first data, and perform image segmentation on the aligned second data to obtain a head image area of the second character in the second data. In practice, image segmentation here may refer to separating of the foreground and the background, or refer to head image detection.

The executing body may accurately extract the head image of the character through the alignment and image segmentation.

Figure 5:
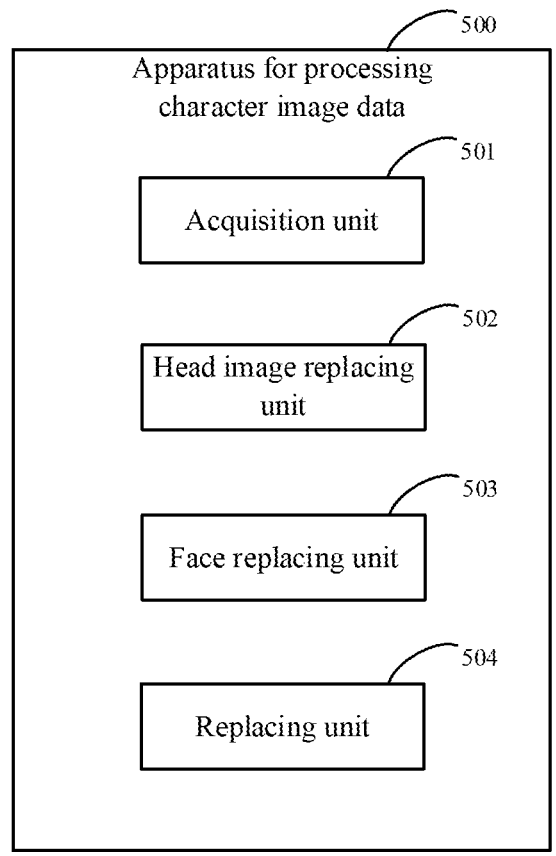
FIG. 5 is a schematic structural diagram of an apparatus for processing character image data according to an embodiment of the present disclosure.

With further reference to FIG. 5, as an implementation of the method shown in the above figures, an embodiment of the present disclosure provides an apparatus for processing character image data, and the apparatus embodiment corresponds to the method embodiment as shown in FIG. 2. In addition to the features described below, the apparatus embodiment may also include the same or corresponding features or effects as the method embodiment shown in FIG. 2. The apparatus may be specifically applied to various electronic devices.

As shown in FIG. 5, the apparatus 500 for processing character image data of the present embodiment includes: an acquisition unit 501, a head image replacing unit 502, a face replacing unit 503 and a replacing unit 504. The acquisition unit 501 is configured to acquire a first video including character images of a first character as first data, and acquire a video including character images of a second character as second data, where a video including character images comprises a movement-state image comprising a head movement-state image, and the first video including character images of the first character includes a plurality of types of movement-state images. The head image replacing unit 502 is configured to replace a head image extracted from the first data with a head image extracted from the second data to obtain a replaced head image, where the replaced head image has a head movement-state image of the first character and a head attribute image of the second character. The face replacing unit 503 is configured to replace a face extracted from the first data with a face extracted from the second data to obtain a replaced face, where the replaced face has a face movement-state image of the first character and a face attribute image of the second character, and a clarity of the replaced face is greater than a clarity of a face in the replaced head image. The replacing unit 504 is configured to replace the face in the replaced head image with the replaced face to obtain a target head image.

In the present embodiment, for the specific processing and technical effects thereof of the acquisition unit 501, the head image replacing unit 502, the face replacing unit 503 and the replacing unit 504 of the apparatus 500 for processing character image data, reference may be made to the relevant descriptions of step 201, step 202, step 203, and step 204 in the corresponding embodiment of FIG. 2, and detailed description thereof will be omitted.

In some alternative implementations of the present embodiment, the time length of the first video is greater than the time length of the second video, and the plurality of types of movement-state images in the first data comprise a plurality of types of necessary movement-state images required to create a virtual character, wherein for each type of at least one type of the plurality of types of necessary movement-state images, the second data lacks at least one of a plurality of necessary movement-state images included in the each type of necessary movement-state image.

In some alternative implementations of the present embodiment, the head movement-state image in the first data comprises a lip roundness and a facial expression, and a head movement-state image in the second data comprises the lip roundness and/or the facial expression; and the apparatus further includes: a creation unit, configured to create the virtual character based on the target head image, wherein the virtual character has the head movement-state image of the first character and the head attribute image of the second character.

In some alternative implementations of the present embodiment, the plurality of types of movement-state images in the first data further comprise a body movement-state image, and the body movement-state image comprises a body movement; and the creation unit is further configured to perform the creating the virtual character based on the target head image as follows: combining the target head image and the first data, so that a head image in the combined first data is the target head image; and creating the virtual character based on the combined first data, wherein the virtual character has a body attribute image of the first character, the head movement-state image of the first character, the body movement-state image of the first character, and the head attribute image of the second character.

In some alternative implementations of the present embodiment, the head image replacing unit is further configured to perform the replacing the head image extracted from the first data with the head image extracted from the second data as follows: replacing the head image extracted from the first data with the head image extracted from the second data using a head image replacement model, wherein the head image replacement model is used to replace a to-be-replaced head image with an adopted head image, so that an obtained head image has a head movement-state image of the to-be-replaced head image and a head attribute image of the adopted head image.

In some alternative implementations of the present embodiment, the apparatus further includes: an extraction unit, configured to extract the head image of the first character and the head image of the second character from the first data and the second data respectively; and the head image replacement model is obtained by training through: training an initial head image replacement model, based on each of the extracted head images, to obtain a trained head image replacement model.

In some alternative implementations of the present embodiment, the initial head image replacement model includes an encoder and decoders, and the number of the decoders is two; the training the initial head image replacement model, based on each of the extracted head images, to obtain the trained head image replacement model, includes: training the encoder and the two decoders based on the head image of the first character in the first data and the head image of the second character in the second data, so that a head image generated by one of the decoders has the head attribute image of the second character.

In some alternative implementations of the present embodiment, the extraction unit is further configured to perform the extracting the head image of the first character and the head image of the second character from the first data and the second data respectively as follows: locating key points of the head images in the first data and the second data, and aligning the head image in the first data with the head image in the second data according to the key points; and performing image segmentation on an alignment result of the first data to extract the head image in the first data, and performing image segmentation on an alignment result of the second data to extract the head image in the second data.

In some alternative implementations of the present embodiment, the face replacing unit is further configured to perform the replacing a face extracted from the first data with a face extracted from the second data as follows: replacing the face extracted from the first data with the face extracted from the second data using a face replacement model, wherein the face replacement model is used to replace a to-be-replaced face with an adopted face, so that an obtained face has a face movement-state image of the to-be-replaced face and a face attribute image of the adopted face.

In some alternative implementations of the present embodiment, the apparatus further includes: a face extraction unit, configured to extract the face of the first character and the face of the second character from the first data and the second data respectively; and the face replacement model is obtained by training through: training an initial face replacement model, based on each of the extracted faces, to obtain a trained face replacement model.

In some alternative implementations of the present embodiment, the initial face replacement model includes an encoder and decoders, and the number of the decoders is two; the training the initial face replacement model, based on each of the extracted faces, to obtain a trained face replacement model, includes: training the encoder and the decoders based on the face in the second data, so that a face generated by one of the decoders has the face attribute image of the second character.

In some alternative implementations of the present embodiment, the face extraction unit is further configured to perform the extracting the face of the first character and the face of the second character from the first data and the second data respectively as follows: locating key points of the face in the first data and key points of the face in the second data, and aligning the face in the first data with the face in the second data according to the key points of the faces; and performing image segmentation on an alignment result of the first data to extract the face in the first data, and performing image segmentation on an alignment result of the second data to extract the face in the second data.

In some alternative implementations of the present embodiment, the replacing unit is further configured to perform the replacing the face in the replaced head image with the replaced face as follows: locating key points of the face in the replaced face and key points of the face in the replaced head image, and aligning the face in the replaced face with the face in the replaced head image according to the key points; and replacing the face in the aligned replaced head image with the aligned replaced face through face fusion.

According to an embodiment of the present disclosure, some embodiments of the present disclosure also provide an electronic device and a readable storage medium.

Figure 6:
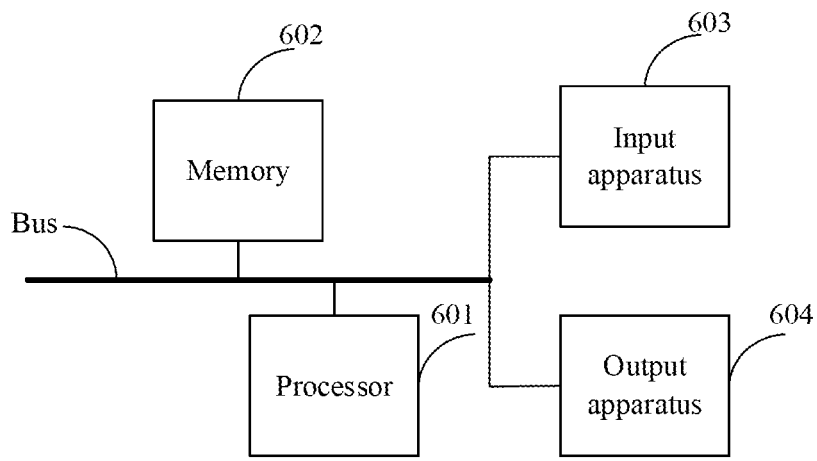
FIG. 6 is a block diagram of an electronic device used to implement the method for processing character image data according to an embodiment of the present disclosure.

As shown in FIG. 6, is a block diagram of an electronic device of the method for processing character image data according to an embodiment of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processors, cellular phones, smart phones, wearable devices, and other similar computing apparatuses. The components shown herein, their connections and relationships, and their functions are merely examples, and are not intended to limit the implementation of the present disclosure described and/or claimed herein.

As shown in FIG. 6, the electronic device includes: one or more processors 601, a memory 602, and interfaces for connecting various components, including high-speed interfaces and low-speed interfaces. The various components are connected to each other using different buses, and may be installed on a common motherboard or in other methods as needed. The processor may process instructions executed within the electronic device, including instructions stored in or on the memory to display graphic information of GUI on an external input/output apparatus (such as a display device coupled to the interface). In other embodiments, a plurality of processors and/or a plurality of buses may be used together with a plurality of memories and a plurality of memories if desired. Similarly, a plurality of electronic device may be connected, and the devices provide some necessary operations, for example, as a server array, a set of blade servers, or a multi-processor system. In FIG. 6, one processor 601 is used as an example.

The memory 602 is a non-transitory computer readable storage medium provided by some embodiments of the present disclosure. The memory stores instructions executable by at least one processor, so that the at least one processor performs the method for processing character image data provided by embodiments of the present disclosure. The non-transitory computer readable storage medium of the present disclosure stores computer instructions for causing a computer to perform the method for processing character image data provided by embodiments of the present disclosure.

The memory 602, as a non-transitory computer readable storage medium, may be used to store non-transitory software programs, non-transitory computer executable programs and modules, such as program instructions/modules corresponding to the method for processing character image data in embodiments of the present disclosure (for example, the acquisition unit 501, the head image replacing unit 502, the face replacing unit 503 and the replacing unit 504 as shown in FIG. 5). The processor 601 executes the non-transitory software programs, instructions, and modules stored in the memory 602 to execute various functional applications and data processing of the server, that is, to implement the method for processing character image data in the foregoing method embodiments.

The memory 602 may include a storage program area and a storage data area, where the storage program area may store an operating system and at least one function required application program; and the storage data area may store data created by the use of the electronic device for processing character image data. In addition, the memory 602 may include a high-speed random access memory, and may also include a non-transitory memory, such as at least one magnetic disk storage device, a flash memory device, or other non-transitory solid-state storage devices. In some embodiments, the memory 602 may optionally include memories remotely provided with respect to the processor 601, and these remote memories may be connected to the electronic device for processing character image data through a network. Examples of the above network include but are not limited to the Internet, intranet, local area network, mobile communication network, and combinations thereof.

The electronic device of the method for processing character image data may further include: an input apparatus 603 and an output apparatus 604. The processor 601, the memory 602, the input apparatus 603, and the output apparatus 604 may be connected through a bus or in other methods. In FIG. 6, connection through the bus is used as an example.

The input apparatus 603 may receive input digital or character information, and generate key signal inputs related to user settings and function control of the electronic device of the method for processing character image data, such as touch screen, keypad, mouse, trackpad, touchpad, pointing stick, one or more mouse buttons, trackball, joystick and other input apparatuses. The output apparatus 604 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, dedicated ASICs (application specific integrated circuits), computer hardware, firmware, software, and/or combinations thereof. These various embodiments may include: being implemented in one or more computer programs that can be executed and/or interpreted on a programmable system that includes at least one programmable processor. The programmable processor may be a dedicated or general-purpose programmable processor, and may receive data and instructions from a storage system, at least one input apparatus, and at least one output apparatus, and transmit the data and instructions to the storage system, the at least one input apparatus, and the at least one output apparatus.

These computing programs (also referred to as programs, software, software applications, or codes) include machine instructions of the programmable processor and may use high-level processes and/or object-oriented programming languages, and/or assembly/machine languages to implement these computing programs. As used herein, the terms "machine readable medium" and "computer readable medium" refer to any computer program product, device, and/or apparatus (for example, magnetic disk, optical disk, memory, programmable logic apparatus (PLD)) used to provide machine instructions and/or data to the programmable processor, including machine readable medium that receives machine instructions as machine readable signals. The term "machine readable signal" refers to any signal used to provide machine instructions and/or data to the programmable processor.

In order to provide interaction with a user, the systems and technologies described herein may be implemented on a computer, the computer has: a display apparatus for displaying information to the user (for example, CRT (cathode ray tube) or LCD (liquid crystal display) monitor); and a keyboard and a pointing apparatus (for example, mouse or trackball), and the user may use the keyboard and the pointing apparatus to provide input to the computer. Other types of apparatuses may also be used to provide interaction with the user; for example, feedback provided to the user may be any form of sensory feedback (for example, visual feedback, auditory feedback, or tactile feedback); and any form (including acoustic input, voice input, or tactile input) may be used to receive input from the user.

The systems and technologies described herein may be implemented in a computing system that includes backend components (e.g., as a data server), or a computing system that includes middleware components (e.g., application server), or a computing system that includes frontend components (for example, a user computer having a graphical user interface or a web browser, through which the user may interact with the implementations of the systems and the technologies described herein), or a computing system that includes any combination of such backend components, middleware components, or frontend components. The components of the system may be interconnected by any form or medium of digital data communication (e.g., communication network). Examples of the communication network include: local area networks (LAN), wide area networks (WAN), and the Internet.

The computer system may include a client and a server. The client and the server are generally far from each other and usually interact through the communication network. The relationship between the client and the server is generated by computer programs that run on the corresponding computer and have a client-server relationship with each other.

The flow charts and block diagrams in the accompanying drawings illustrate architectures, functions and operations that may be implemented according to the systems, methods and computer program products of various embodiments of the present disclosure. In this regard, each of the blocks in the flowcharts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in embodiments of the present disclosure may be implemented by means of software or hardware. The described units may also be provided in a processor, for example, may be described as: a processor, including an acquisition unit, a head image replacing unit, a face replacing unit and a replacing unit. Here, the names of these units do not in some cases constitute limitations to such units themselves. For example, the replacing unit may also be described as "a unit for replacing the face in the replaced head image with the replaced face to obtain a target head image."

In another aspect, some embodiments of the present disclosure further provides a computer readable medium. The computer readable medium may be included in the apparatus in the above described embodiments, or a stand-alone computer readable medium not assembled into the apparatus. The computer readable medium stores one or more programs. The one or more programs, when executed by the apparatus, cause the apparatus to: acquire a video including character images of a first character as first data, and acquire a video including character images of a second character as second data, where the video including character images includes a movement-state image including a head movement-state image, and the video including character images of the first character includes a plurality of types of movement-state images; replace a head image extracted from the first data with a head image extracted from the second data to obtain a replaced head image, where the replaced head image has a head movement-state image of the first character and a head attribute image of the second character; replace a face extracted from the first data with a face extracted from the second data to obtain a replaced face, where the replaced face has a face movement-state image of the first character and a face attribute image of the second character, and a clarity of the replaced face is greater than a clarity of a face in the replaced head image; and replace the face in the replaced head image with the replaced face to obtain a target head image.

The above description only provides an explanation of preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in embodiments of the present disclosure are examples.

What is claimed is:

1. A method for processing character image data, the method comprising:
   acquiring, as first data, a first video comprising character images of a first character, and acquiring, as second data, a second video comprising character images of a second character, wherein a video comprising character images comprises a movement-state image comprising a head movement-state image, and the first video comprising the character images of the first character includes a plurality of types of movement-state images;

replacing a head image extracted from the first data with a head image extracted from the second data using a pre-trained head image replacement model to obtain a replaced head image, wherein the replaced head image has a head movement-state image of the first character and a head attribute image of the second character, and the pre-trained head image replacement model is configured to replace a to-be-replaced head image with an adopted head image, so that an obtained head image has a head movement-state image of the to-be-replaced head image and a head attribute image of the adopted head image;

replacing a face extracted from the first data with a face extracted from the second data to obtain a replaced face, wherein the replaced face has a face movement-state image of the first character and a face attribute image of the second character, and a clarity of the replaced face is greater than a clarity of a face in the replaced head image; and replacing the face in the replaced head image with the replaced face to obtain a target head image;

wherein the method further comprises:

splicing the target head image to a body of the first character to create a virtual character, wherein the virtual character has a face movement-state image of the first character, a face attribute image of the second character, and a body part of the first character.

2. The method according to claim 1, wherein a time length of the first video is greater than a time length of the second video, and the plurality of types of movement-state images in the first data comprise a plurality of types of necessary movement-state images required to create a virtual character, wherein for each type of at least one type of the plurality of types of necessary movement-state images, the second data lacks at least one of a plurality of necessary movement-state images included in the each type of necessary movement-state image.

3. The method according to claim 2, wherein the head movement-state image in the first data comprises a lip roundness and a facial expression, and a head movement-state image in the second data comprises at least one of the lip roundness or the facial expression; and the method further comprises:

creating the virtual character based on the target head image, wherein the virtual character has the head movement-state image of the first character and the head attribute image of the second character.

4. The method according to claim 3, wherein the plurality of types of movement-state images in the first data further comprise a body movement-state image, and the body movement-state image comprises a body movement; and the creating the virtual character based on the target head image, comprises:

combining the target head image and the first data, so that a head image in the combined first data is the target head image; and creating the virtual character based on the combined first data, wherein the virtual character has a body attribute image of the first character, the head movement-state image of the first character, the body movement-state image of the first character, and the head attribute image of the second character.

5. The method according to claim 1, wherein the method further comprises:

extracting the head image of the first character and the head image of the second character from the first data and the second data respectively; and the pre-trained head image replacement model is trained through:

training an initial head image replacement model, based on each of the extracted head images, to obtain a trained head image replacement model.

6. The method according to claim 5, wherein the initial head image replacement model comprises an encoder and decoders, and a number of the decoders is two;

the training the initial head image replacement model, based on each of the extracted head images, to obtain the trained head image replacement model, comprises:

training the encoder and the two decoders based on the head image of the first character in the first data and the head image of the second character in the second data, so that a head image generated by one of the decoders has the head attribute image of the second character.

7. The method according to claim 5, wherein the extracting the head image of the first character and the head image of the second character from the first data and the second data respectively, comprises:

locating key points of the head images in the first data and the second data, and aligning the head image in the first data with the head image in the second data according to the key points; and performing image segmentation on an alignment result of the first data to extract the head image in the first data, and performing image segmentation on an alignment result of the second data to extract the head image in the second data.

8. The method according to claim 1, wherein the replacing the face extracted from the first data with the face extracted from the second data, comprises:

replacing the face extracted from the first data with the face extracted from the second data using a face replacement model, wherein the face replacement model is used to replace a to-be-replaced face with an adopted face, so that an obtained face has a face movement-state image of the to-be-replaced face and a face attribute image of the adopted face.

9. The method according to claim 8, wherein the method further comprises:

extracting the face of the first character and the face of the second character from the first data and the second data respectively; and the face replacement model is obtained by training through:

training an initial face replacement model, based on each of the extracted faces, to obtain a trained face replacement model.

10. The method according to claim 9, wherein the initial face replacement model comprises an encoder and decoders, and a number of the decoders is two;

the training the initial face replacement model, based on each of the extracted faces, to obtain the trained face replacement model, comprises:

training the encoder and the decoders based on the face in the second data, so that a face generated by one of the decoders has the face attribute image of the second character.

11. The method according to claim 9, wherein the extracting the face of the first character and the face of the second character from the first data and the second data respectively, comprises:

locating key points of the face in the first data and key points of the face in the second data, and aligning the face in the first data with the face in the second data according to the key points of the faces; and performing image segmentation on an alignment result of the first data to extract the face in the first data, and performing image segmentation on an alignment result of the second data to extract the face in the second data.

12. The method according to claim 1, wherein the replacing the face in the replaced head image with the replaced face, comprises:

locating key points of the face in the replaced face and key points of the face in the replaced head image, and aligning the face in the replaced face with the face in the replaced head image according to the key points; and replacing the face in the aligned replaced head image with the aligned replaced face through face fusion.

13. The method according to claim 1, wherein the pre-trained head image replacement model is trained by:

extracting the head image of the first character from the first data and the head image of the second character from the second data, and training an initial head image replacement model based on the head image of the first character and the head image of the second character, the initial head image replacement model being a Generative Adversarial Network (GAN);

generating a head image having the head attribute image of the second character through a generator of the GAN;

recognizing whether the generated head image has the head attribute image of the second character through a discriminator of the GAN; and determining that the training of the head image replacement model is completed in response to a recognizing result being that the generated head image has the head attribute image of the second character.

14. An electronic device, comprising:

one or more processors; and a storage apparatus, for storing one or more programs, wherein the one or more programs, when executed by the one or more processors, cause the one or more processors to implement operations comprising:

acquiring, as first data, a first video comprising character images of a first character, and acquiring, as second data, a second video comprising character images of a second character, wherein a video comprising character images comprises a movement-state image comprising a head movement-state image, and the first video comprising the character images of the first character includes a plurality of types of movement-state images;

replacing a head image extracted from the first data with a head image extracted from the second data using a pre-trained head image replacement model to obtain a replaced head image, wherein the replaced head image has a head movement-state image of the first character and a head attribute image of the second character, and the pre-trained head image replacement model is configured to replace a to-be-replaced head image with an adopted head image, so that an obtained head image has a head movement-state image of the to-be-replaced head image and a head attribute image of the adopted head image;

replacing a face extracted from the first data with a face extracted from the second data to obtain a replaced face, wherein the replaced face has a face movement-state image of the first character and a face attribute image of the second character, and a clarity of the replaced face is greater than a clarity of a face in the replaced head image; and replacing the face in the replaced head image with the replaced face to obtain a target head image;

wherein the operations further comprise:

splicing the target head image to a body of the first character to create a virtual character, wherein the virtual character has a face movement-state image of the first character, a face attribute image of the second character, and a body part of the first character.

15. The electronic device according to claim 14, wherein a time length of the first video is greater than a time length of the second video, and the plurality of types of movement-state images in the first data comprise a plurality of types of necessary movement-state images required to create a virtual character, wherein for each type of at least one type of the plurality of types of necessary movement-state images, the second data lacks at least one of a plurality of necessary movement-state images included in the each type of necessary movement-state image.

16. The electronic device according to claim 15, wherein the head movement-state image in the first data comprises a lip roundness and a facial expression, and a head movement-state image in the second data comprises the lip roundness and/or the facial expression; and the operations further comprise:

creating the virtual character based on the target head image, wherein the virtual character has the head movement-state image of the first character and the head attribute image of the second character.

17. The electronic device according to claim 16, wherein the plurality of types of movement-state images in the first data further comprise a body movement-state image, and the body movement-state image comprises a body movement; and the creating the virtual character based on the target head image, comprises:

combining the target head image and the first data, so that a head image in the combined first data is the target head image; and creating the virtual character based on the combined first data, wherein the virtual character has a body attribute image of the first character, the head movement-state image of the first character, the body movement-state image of the first character, and the head attribute image of the second character.

18. The electronic device according to claim 17, wherein the operations further comprise:

extracting the head image of the first character and the head image of the second character from the first data and the second data respectively; and the head image replacement model is obtained by training through:

training an initial head image replacement model, based on each of the extracted head images, to obtain a trained head image replacement model.

19. A non-transitory computer readable storage medium, storing a computer program thereon, wherein the program, when executed by a processor, cause the processor to implement operations comprising:

acquiring, as first data, a first video comprising character images of a first character, and acquiring, as second data, a second video comprising character images of a second character, wherein a video comprising character images comprises a movement-state image comprising a head movement-state image, and the first video comprising the character images of the first character includes a plurality of types of movement-state images;

replacing a head image extracted from the first data with a head image extracted from the second data using a pre-trained head image replacement model to obtain a replaced head image, wherein the replaced head image has a head movement-state image of the first character and a head attribute image of the second character, and the pre-trained head image replacement model is configured to replace a to-be-replaced head image with an adopted head image, so that an obtained head image has a head movement-state image of the to-be-replaced head image and a head attribute image of the adopted head image;

replacing a face extracted from the first data with a face extracted from the second data to obtain a replaced face, wherein the replaced face has a face movement-state image of the first character and a face attribute image of the second character, and a clarity of the replaced face is greater than a clarity of a face in the replaced head image; and replacing the face in the replaced head image with the replaced face to obtain a target head image;

wherein the method further comprises:

splicing the target head image to a body of the first character to create a virtual character, wherein the virtual character has a face movement-state image of the first character, a face attribute image of the second character, and a body part of the first character.

* * * * *